US010789529B2

(12) United States Patent
Orr et al.

(10) Patent No.: US 10,789,529 B2
(45) Date of Patent: Sep. 29, 2020

(54) NEURAL NETWORK DATA ENTRY SYSTEM

(71) Applicant: Microsoft Technology Licensing, LLC, Redmond, WA (US)

(72) Inventors: Douglas Alexander Harper Orr, Brentwood (GB); Juha Iso-Sipila, London (GB); Marco Fiscato, London (GB); Matthew James Wilson, London (GB); Joseph Osborne, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 729 days.

(21) Appl. No.: 15/474,976

(22) Filed: Mar. 30, 2017

(65) Prior Publication Data

US 2018/0150744 A1    May 31, 2018

(30) Foreign Application Priority Data

Nov. 29, 2016    (GB) ...................................... 1620235

(51) Int. Cl.
*G06N 3/08*    (2006.01)
*G06N 3/02*    (2006.01)
(Continued)

(52) U.S. Cl.
CPC .............. *G06N 3/08* (2013.01); *G06F 40/274* (2020.01); *G06F 40/30* (2020.01); *G06N 3/02* (2013.01);
(Continued)

(58) Field of Classification Search
CPC .......... G06N 3/08; G06N 3/0454; G06N 3/02; G06N 3/084; G06N 5/04; G06N 3/0445; G06F 17/2785; G06F 17/276
See application file for complete search history.

(56) References Cited

U.S. PATENT DOCUMENTS 5,748,512 A * 5/1998 Vargas .................. G06F 3/0237
345/173
6,621,424 B1    9/2003 Brand
(Continued)

FOREIGN PATENT DOCUMENTS

EP    0582907 A2    2/1994

OTHER PUBLICATIONS

Jln Wang, "Dimensional Sentiment Analysis Using a Regional CNN-LSTM Model", Association for Computational Linguistics, pp. 225-230 (Year: 2016).*

(Continued)

*Primary Examiner* — Vincent Gonzales
*Assistant Examiner* — Imad Kassim
(74) *Attorney, Agent, or Firm* — Schwegman Lundberg & Woessner, P.A.

(57) ABSTRACT

A data entry system is described which has a user interface which receives a sequence of one or more context text items input by a user. The data entry system has a predictor trained to predict a next item in the sequence. The predictor comprises a plurality of learnt text item embeddings each text item embedding representing a text item in a numerical form, the text item embeddings having a plurality of different lengths. A projection component obtains text item embeddings of the context text items and projects these to be of the same length. The predictor comprises a trained neural network which is fed the projected text item embeddings and which computes a numerical output associated with the predicted next item.

20 Claims, 9 Drawing Sheets

(51) Int. Cl.
*G06N 3/04* (2006.01)
*G06F 40/30* (2020.01)
*G06F 40/274* (2020.01)
*G06N 5/04* (2006.01)

(52) U.S. Cl.
CPC ........... *G06N 3/0454* (2013.01); *G06N 3/084* (2013.01); *G06N 5/04* (2013.01); *G06N 3/0445* (2013.01)

(56) References Cited

U.S. PATENT DOCUMENTS

| | | | | |
|---|---|---|---|---|
| 7,679,534 | B2* | 3/2010 | Kay | G06F 3/0233 341/22 |
| 8,484,573 | B1* | 7/2013 | Zhai | G06F 3/0237 715/773 |
| 8,819,574 | B2* | 8/2014 | Ouyang | G06F 3/0482 715/773 |
| 9,547,420 | B1* | 1/2017 | Cassidy | G06F 3/04883 |
| 9,678,664 | B2* | 6/2017 | Zhai | G06F 3/0219 |
| 9,830,315 | B1* | 11/2017 | Xiao | G06F 40/30 |
| 2008/0243905 | A1* | 10/2008 | Pavlov | G06F 16/90344 |
| 2010/0125594 | A1 | 5/2010 | Li et al. | |
| 2011/0047110 | A1* | 2/2011 | Rinkus | G06N 3/02 706/18 |
| 2011/0320498 | A1 | 12/2011 | Flor | |
| 2012/0310627 | A1 | 12/2012 | Qi et al. | |
| 2012/0324391 | A1 | 12/2012 | Tocci | |
| 2014/0067372 | A1 | 3/2014 | Pasquero et al. | |
| 2014/0278379 | A1* | 9/2014 | Coccaro | G10L 15/1822 704/202 |
| 2014/0297267 | A1* | 10/2014 | Spencer | G06F 17/276 704/9 |
| 2015/0012873 | A1 | 1/2015 | Bi et al. | |
| 2015/0082229 | A1 | 3/2015 | Ouyang et al. | |
| 2015/0095017 | A1* | 4/2015 | Mnih | G06N 3/0454 704/9 |
| 2016/0321239 | A1* | 11/2016 | Iso-Sipila | G06F 40/274 |
| 2017/0116498 | A1* | 4/2017 | Raveane | G06N 3/10 |
| 2018/0068371 | A1* | 3/2018 | Krishnamurthy | G06Q 30/0631 |
| 2018/0121539 | A1* | 5/2018 | Ciulla | G06F 16/3344 |
| 2018/0203848 | A1* | 7/2018 | Perez | G10L 25/30 |
| 2019/0155504 | A1* | 5/2019 | Zhai | G06F 3/0219 |

OTHER PUBLICATIONS

Wieting, "Charagram: Embedding Words and Sentences via Character n-grams", Jul. 10, 2016 (Year: 2016).*

Kim "Convolutional Sentence Kernel from Word Embeddings for Short Text Categorization", pp. 775-780, Sep. 17-21, 2015 (Year: 2015).*

Li. "Learning Document Embeddings by Predicting N-Grams for Sentiment Classification of Long Movie Reviews", Apr. 23, 2016, pp. 1-8 (Year: 2016).*

Jurgovsky, et al., "Evaluating Memory Efficiency and Robustness of Word Embeddings", In the European Conference on Information Retrieval, Mar. 20, 2016, pp. 200-211.

Ling, et al., "Word Embeddings with Limited Memory", In the 54th Annual Meeting of the Association for Computational Linguistics, vol. 2, Aug. 7, 2016, 387-392.

Makarenkov, et al., "Language Models with GloVe Word Embeddings", Retrieved from «https://www.researchgate.net/publication/309037295_Language_Models_with_Pre-Trained_GloVe_Word_Embeddings», Oct. 12, 2016, 7 Pages.

"International Search Report and Written Opinion Issued in PCT Application No. PCT/US2017/062915", dated Feb. 15, 2018, 11 Pages.

El-Qawasmeh, Eyas, "Word Prediction via a Clustered Optimal Binary Search Tree", In Proceedings of the International Arab Journal of Information Technology, vol. 1, No. 1, Jan. 2004, pp. 135-141.

Reddy. Et al., "New malicious code detection using variable length n-grams", In Proceedings of the Second International conference on Information Systems Security, Dec. 19, 2006, 1 pages.

"Capstone Project: Exploratory analysis for predictive model of text", https://rstudio-pubs-static.s3.amazonaws.com/163537_012f7f927e4742b989f5e53702bd6886.html, Published on: Mar. 9, 2016, 9 pages.

Irvine, et al., "Hallucinating Phrase Translations for Low Resource MT", In Proceedings of the Eighteenth Conference on Computational Natural Language Learning, Jun. 26, 2014, 11 pages.

"Text Prediction using N-Grams", http://rstudio-pubs-static.s3.amazonaws.com/40628_ed35784a5777451eb2c5992cc9e1d4bb.html, Published on: Oct. 26, 2016, 8 pages.

Huffman, David A., "A Method for the Construction of Minimum-Redundancy Codes", In Proceedings of the IRE, vol. 40, Nov. 9, Sep., 1098, pp. 1098-1101.

Chitnis, et al., "Variable-LengthWord Encodings for Neural Translation Models", In Proceedings of the Conference on Empirical Methods in Natural Language Processing, Sep. 17, 2015, 6 pages.

Niesler, T.R, "A variable-Length Category-Based N-Gram Language Model", In Proceedings of Acoustics, Speech, and Signal Processing, vol. 1, May, 1996, 4 pages.

* cited by examiner

NEURAL NETWORK DATA ENTRY SYSTEM

CROSS-REFERENCE TO RELATED APPLICATIONS

This non-provisional utility application claims priority to GB patent application number 1620235.0 entitled "NEURAL NETWORK DATA ENTRY SYSTEM" and filed on Nov. 29, 2016, which is incorporated herein in its entirety by reference.

BACKGROUND

Data entry such as entering text characters, emoji and other data into electronic devices which have a small form factor is time consuming, cumbersome and error prone for end users. One approach to facilitating data entry is to provide predictive keyboards such as soft keyboards which are displayed on a touchscreen of the electronic device and used by the end user to type in characters, emoji, symbols and other data. Predictive keyboards typically present one or more candidate predicted words or phrases as options for the user to select and so enter into the electronic device.

The technology used to give the functionality of such predictive keyboards includes neural network technology in some cases. For example, where neural networks are used to predict candidate words that a user is likely to want to input. However, neural networks take up significant resources (such as memory and processing resources) and this makes it difficult to achieve good accuracy of performance where the neural network is located on a resource constrained device such as a smart phone, tablet computer, wearable computer or other resource constrained device.

The embodiments described below are not limited to implementations which solve any or all of the disadvantages of known data entry systems using neural network technology.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A data entry system is described which has a user interface which receives a sequence of one or more context text items input by a user. The data entry system has a predictor trained to predict a next item in the sequence. The predictor comprises a plurality of learnt text item embeddings each text item embedding representing a text item in a numerical form, the text item embeddings having a plurality of different lengths. A projection component obtains text item embeddings of the context text items and projects these to be of the same length. The predictor comprises a trained neural network which is fed the projected text item embeddings and which computes a numerical output associated with the predicted next item.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Inputting data such as text, images, or other data to electronic devices is difficult especially where those electronic devices have a small form factor. Neural network technology may be used to predict items in sequences of items of data and offer those as candidates for input and this reduces burden on the end user. However, neural networks take up significant memory and processing resources which presents a difficulty where electronic devices with limited resources are involved. Various examples described herein demonstrate how memory used by neural network data entry systems is reduced whilst maintaining quality of performance of neural network predictive technology.

Figure 1:
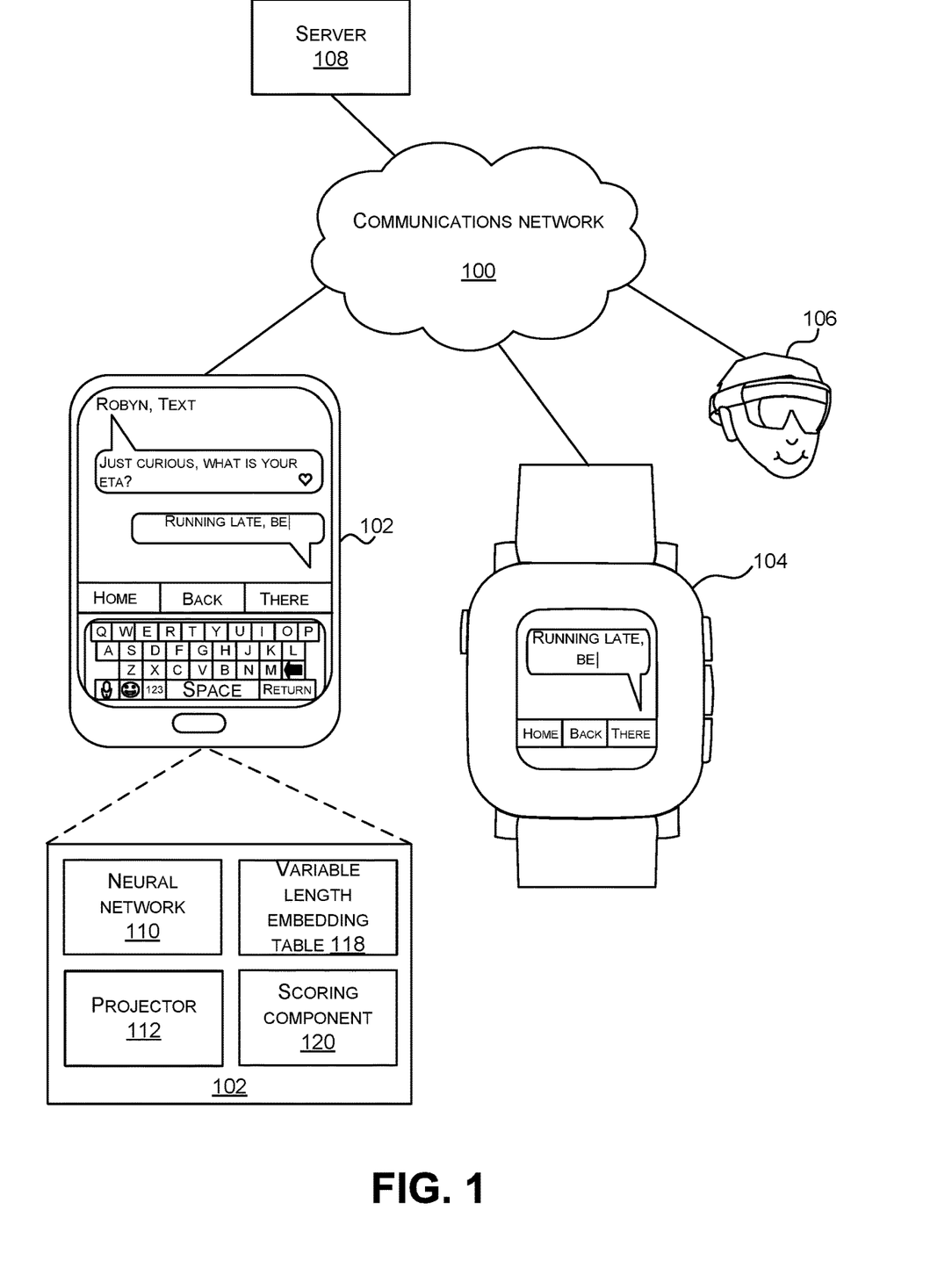
FIG. 1 is a schematic diagram of various electronic devices which have a neural network data entry system.

FIG. 1 is a schematic diagram of a plurality of electronic devices 102, 104, 106 in communication with a server 108 over a communications network 100 such as the internet or any other communications network. The electronic devices 102, 104, 106 each store a neural network 110 for predicting items in a sequence of items such as words, phrases, morphemes, characters or other units of language. The items can be images in some examples, such as emoji, emoticons, stickers or other images which are used as part of text. The neural network 110 has been trained in advance, for example, during a manufacturing stage or in an offline stage.

The training takes place at a server 108 or any other entity and uses training data as explained in more detail later in this document.

The neural network 110 comprises layers of nodes interconnected by edges and with weights associated with the nodes and/or edges. The neural network 110 has a variable length item embedding store 118 shown in FIG. 1 as a separate box in order to aid understanding of the present technology, even though the item embeddings may be considered as part of the neural network 110 itself.

The electronic devices in FIG. 1 include a smart phone 102, a smart watch 104 and a head worn augmented-reality computing device 106 and these are examples only as other electronic devices may be used such as a desk top computer, tablet computer, laptop computer and others.

In the examples described herein the neural network 110 uses item embeddings. An item embedding is a plurality of learnt weights representing an item of the sequence of items in a form that can be processed by units of a neural network. An item embedding may be a real valued vector in some cases. In some examples, an item embedding also comprises a scalar bias value which is stored as part of the real valued vector or which is stored separately. The learnt weights of the item embedding are numerical values. The item embeddings are used in at least two different stages of the data entry process and these may be referred to as a neural network input stage and a neural network output stage. At the neural network input stage, where a user inputs an item such as a word, phrase, morpheme, emoji, character or other context item into the electronic device the neural network copy at the device is used to predict candidate next items in a sequence of the items. In order to input the item into the neural network it is mapped to an item embedding which is then input to the neural network. Where the user inputs a sequence of items such as the words "I", "am", "a", "beautiful" then each of these individual words is mapped to a corresponding item embedding and input to the neural network in order to predict candidate next words such as "person".

At the neural network output stage, an output layer of the neural network produces numerical values which are activation levels of units in the output layer of the network. These numerical values form a predicted item embedding. In order to convert the predicted item embedding into scores for individual candidate items (such as candidate words, phrases, morphemes, emoji or other items) a measure of similarity is computed between the predicted item embedding and individual ones of a plurality of item embeddings available at the electronic device. In some examples a dot product is computed as the measure of similarity but this is not essential as other measures of similarity may be used. The similarity measures give a plurality of scores, one for each of the item embeddings, which when normalized express the likelihood that the next item in the sequence is each of the items corresponding to the item embeddings. Where an item embedding has an associated bias value, the bias value is aggregated with the score, for example by addition, multiplication or other forms of aggregation. In this way the score becomes biased in a manner taking into account the bias value. The bias values are manually configured, set to the log probability of the item under a unigram model (which may be computed from a training set of items), or learnt through backpropagation in a similar way to the item embeddings.

In order that a neural network 110 at an electronic device 102, 104, 106 is able to operate to generate predictions, it uses item embeddings for the neural network input and output stages mentioned above. The electronic device 102 has at least one stored table of item embeddings 118 to facilitate the input and output stages. The stored table of item embeddings 118 may be shared between the input and output neural network stages. However, even despite this sharing, which avoids the need to have more than one embedding table (one for the input stage and one for the output stage) the item embeddings take up memory at the electronic device and this memory is limited. The memory used by the item embeddings, which are typically stored in a table with each row of the table being one item embedding, is significant since a number of rows in the table may be ten thousand or more and the number of columns as many as 160 or more.

In order to reduce the amount of memory used by the table of item embeddings, various examples described herein use item embeddings of different lengths. This gives a variable length embedding table 118. In an example, item embeddings for items that appear with a low frequency in user input are given shorter item embeddings than items that appear with high frequency in user input. This enables the amount of memory taken by the embedding table to be reduced. For example, rather than having all the rows in the embedding table having 160 columns, a first proportion of these have 80 columns, a second proportion have 40 columns and the remaining rows have 160 columns. However, this is an example only and other arrangements of different lengths of row in the embedding table are possible.

Quality or accuracy of the predictions made at the electronic devices using the neural network is another factor to consider. Where the dimensionality of an embedding is lower (fewer columns in the row of the embedding table) the ability of the embedding to describe the corresponding text item is reduced. Thus by varying the length of item embeddings a trade off is controlled between the amount of memory taken by the embedding table and the ability of the item embeddings to describe the items.

In addition to a neural network 110 with a variable length embedding table 118 the electronic device, such as smart phone 102, has a projector 112 and a scoring component 120. In the context of the neural network input stage, the projector 112 acts to project an item embedding up to a specified length, suitable for input to the neural network. In the context of the neural network output stage, the projector 112 acts to project a predicted embedding, output by the neural network, down to a shorter specified length, suitable for computing a score with item embeddings in the table which have that shorter specified length. Scores are computed using scoring component 120 at the output stage of the neural network 110 as described in more detail below.

FIG. 1 shows a server 108 connected to communications network 100 and which is used to provide all or part of the functionality of the neural network 110, variable length embedding table 118 and projector 112. An electronic device is able to communicate with the server 108 to carry out all or part of the functionality of the neural network 110, variable length embedding table 118 and projector 112.

Alternatively, or in addition, the functionality of the server and/or the electronic device described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
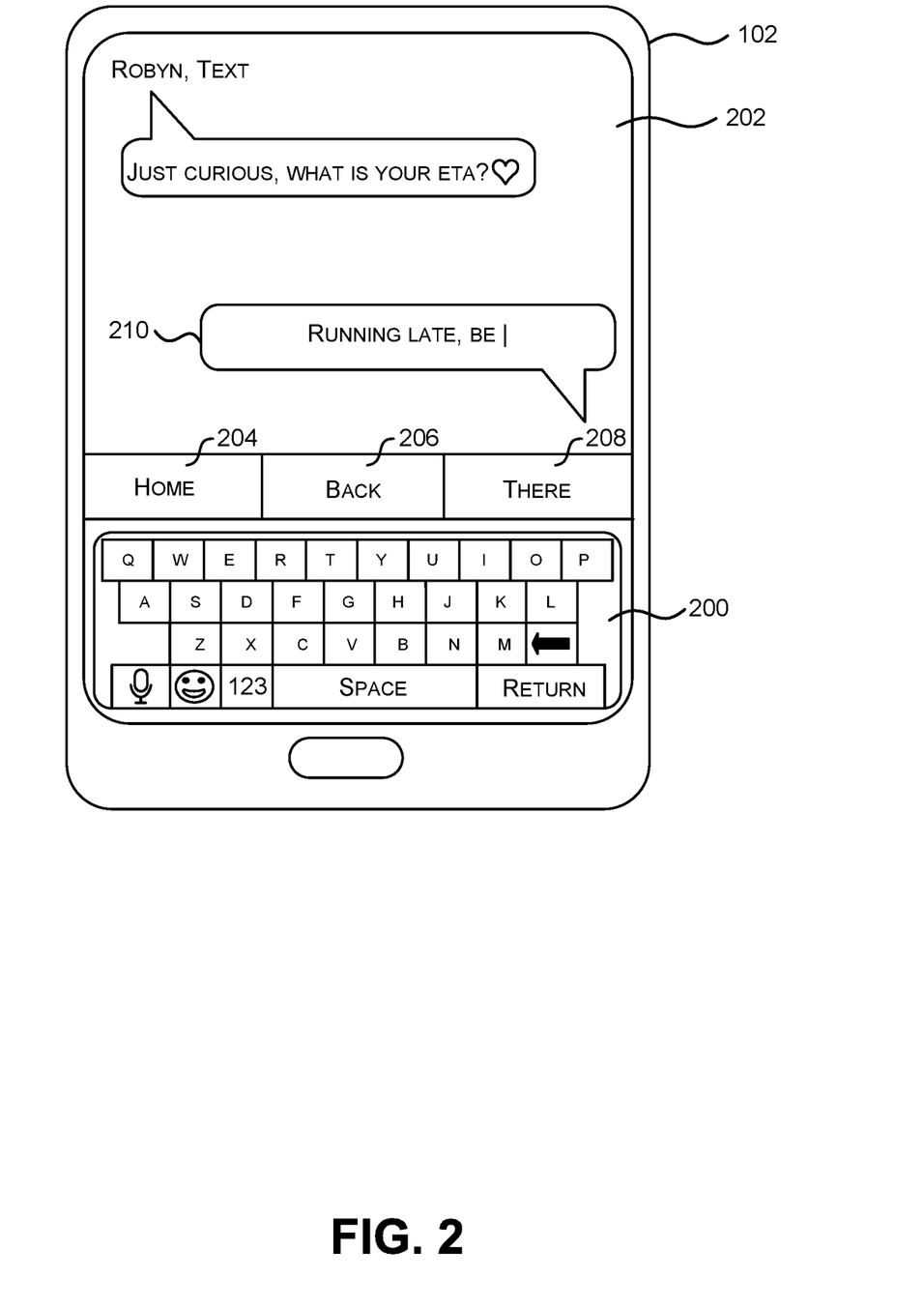
FIG. 2 is a schematic diagram of a smart phone showing a user interface display for data entry.

FIG. 2 is a schematic diagram of electronic device 102 in the case this device is a smart phone having a predictive keyboard that uses neural network technology. The smart phone has a display screen 202 such as a touch screen which displays a keyboard 200 for entering text to the electronic device 102. The keyboard 200 includes three candidate prediction regions 204, 206, 208 which display candidate predictions computed by the neural network technology. In this example, the user has received a short message service (SMS) message from Robyn which says "Just curious, what is your ETA?". The user is in the process of entering a reply SMS message in entry field 210 and so far has input the words "Running late, be" and the predictive keyboard has computed three candidate predicted next words which are "home", "back" and "there" and these are displayed on the keyboard 200. The user is able to select one of the candidate predicted next words rather than entering the separate characters to form that word. This saves burden for the end user with regard to data entry. However, the quality of the predictions is important because if the candidate word is not the actual word the user intends to enter then the user has to enter the individual characters of the intended word. The quality of the predictions depends on various factors such as the amount and variety of training data used during training, the type of training used, the architecture of the neural network, the ability of the neural network to generalize to examples it has not seen during training, and other factors such as the available item embeddings (in the case that item embeddings are used as described below with reference to FIG. 3). The candidate predictions are updated in some examples, as the user enters individual characters of the intended word.

Figure 3:
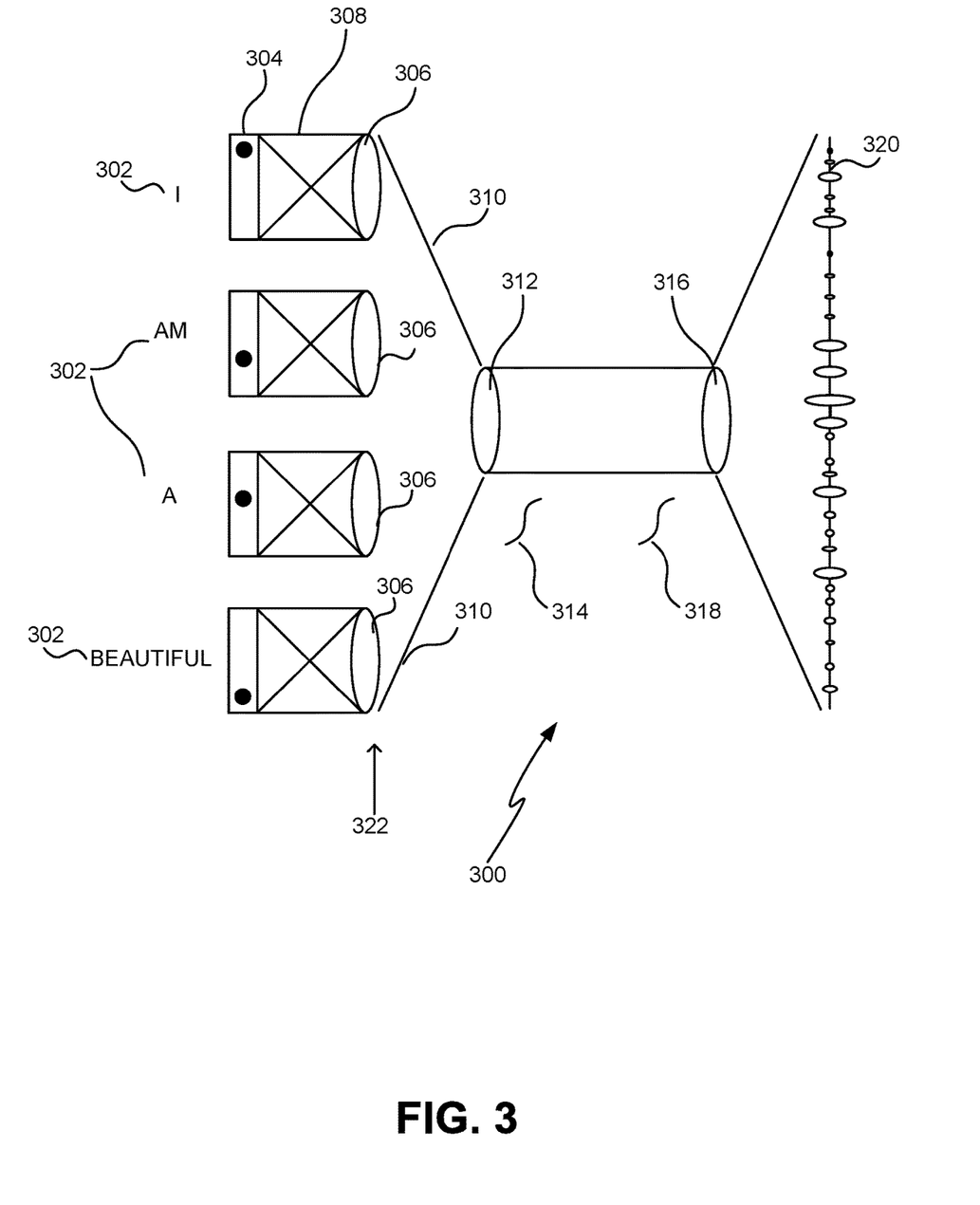
FIG. 3 is a schematic diagram of a neural network language model.

FIG. 3 is a schematic diagram of a neural network 300 such as the neural network 110 of FIG. 1.

A neural network is a collection of nodes (also referred to as units) interconnected by edges and where there are weights associated with the nodes and/or edges. A non-linear function is commonly applied in each node to produce its activation and a non-exhaustive list of non-linear functions which may be used is: sigmoid, tan Ch, rectifier. During a training phase the weights are updated according to update rules in the light of training examples. The units comprise input units, hidden units and output units. Input units are units at which input is made to the neural network, hidden units are connected between input units and output units (or other hidden units in the case of deep networks), and output units are units at which output from the neural network is observed. A neural network may have a layered construction with a layer of input nodes, one or more layers of hidden units and at least one output layer. During use of the neural network at test time (i.e. after training) as a signal passes through a layer it produces an output via the activations which becomes the input to the next layer of the neural network and so on, until the signal reaches the output layer and the output units are activated. The pattern of activations at the output layer gives the prediction of the neural network. The pattern of activations has been influenced by the weights learnt during the training phase.

The neural network 300 is trained using back propagation or any other neural network training algorithm. A back propagation algorithm comprises inputting a labeled training data instance to the neural network, propagating the training instance through the neural network (referred to as forward propagation) and observing the output. The training data instance is labeled and so the ground truth output of the neural network is known and the difference or error between the observed output and the ground truth output is found and provides information about a loss function. A search is made to try find a minimum of the loss function which is a set of weights of the neural network that enable the output of the neural network to match the ground truth data. Searching the loss function is achieved using gradient descent or stochastic gradient descent or in other ways.

In the example of FIG. 3 the neural network 300 comprises an input layer 322, a single hidden layer 312 and a single output layer 316. However, this is one example only and many other types of architecture may be used with more hidden layers for example, and with recurrent structures where connections between units form a directed cycle.

In the example of FIG. 3 a user has entered the words "I", "am", "a" and "beautiful" and each word is represented by the position of a 1 in a vector otherwise filled with zeros. These vectors are illustrated at 304 in FIG. 3. Each individual word indicator vector 304 is mapped to an item embedding vector 306 by using a mapping 308. The item embeddings are looked up from a table 118 of pre-computed item embeddings where there are different lengths of item embeddings as described above in order to save memory. The item embeddings 306 are input to input units of an input layer 322 and create activations which propagate forward through the input layer as indicated by lines 310 to reach hidden layer 312. The hidden layer receives the output of the input layer as its input. The hidden layer processes the signal according to activation functions represented as 314 in FIG. 3 and weights at the hidden layer units. The output of the hidden layer 312 reaches the output layer 316 which also processes the signal according to activation functions represented as 318 in FIG. 3 and generates activations represented as blobs on line 320 at the output units. The activations of the output units are converted to scores of items in a set of available item embeddings. This is done by taking a dot product (or other measure of similarity) between the predicted item embedding given by the activations of the output units and each of the available item embeddings and then, in the case that scalar bias values are available, adding a scalar bias value which has been stored for that item. The scores may be normalized so that they sum to one, for example by applying a softmax function or in other ways. If the available item embeddings are for the words "person", "being", "child", "house", "day" then the result is a score for each of "person", "being" "child" "house" and "day" which indicates how likely the word is to be the next word intended by the user.

Figure 4:
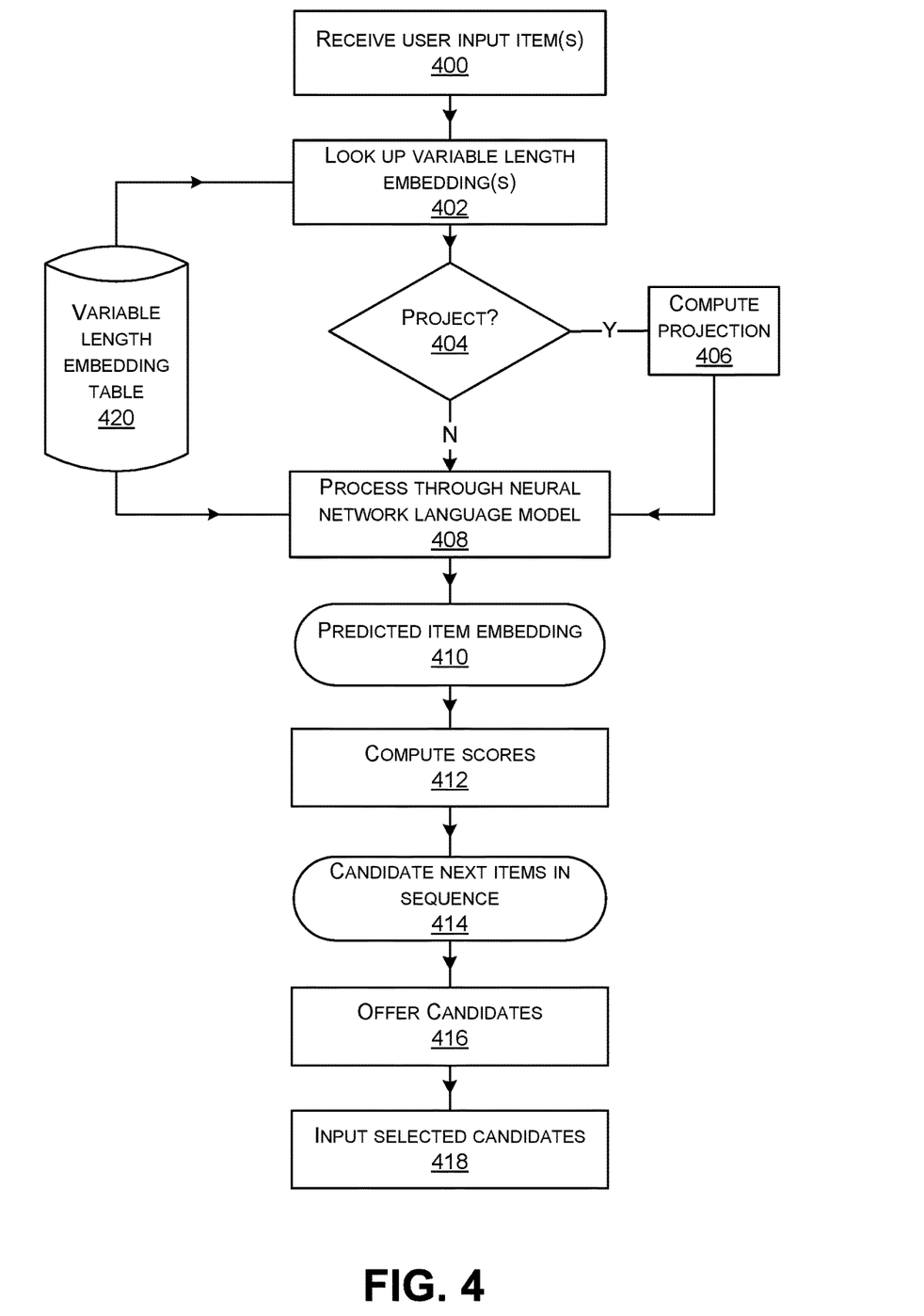
FIG. 4 is a flow diagram of a process at a neural network data entry system.

FIG. 4 is a flow diagram of a method of operation at an electronic device such as electronic device 102, 104, 106 of FIG. 1.

The electronic device receives 400, at an input interface, an item input by the user as part of a sequence of items. For example, the input interface comprises a touch screen and graphical user interface at the electronic device. The electronic device receives a word typed into a predictive keyboard at the electronic device, or a phrase, emoji, character or other item typed into a predictive keyboard at the electronic device. In another example, the input interface comprises a microphone, an analog to digital signal converter, and a speech recognition component whereby the user is able to speak words or phrases to input to the electronic device. The input interface is any mechanism which enables a user to input data to the electronic device.

The electronic device has a stored variable length embedding table 420 as described above. It looks up 402 the item embeddings in the table 420 for each of the user input items. For example, suppose the user has entered "Bloomsbury", "is", "the". Suppose the word "Bloomsbury" has a short item embedding with 40 columns of data in a row of the embedding table 420 since "Bloomsbury" is a name with relatively low frequency in the English language. Suppose that in contrast, the words "is" and "the" have item embeddings with 160 columns of data per row.

The electronic device decides whether to project the retrieved item embeddings at step 404. For example, any item embeddings which have a length less than 160 (or another specified maximum length) are projected up to have a length of 160 (or other specified length). This is done by computing a projection 406. Different possible ways of computing the projection are described later.

In the example where the user enters "Bloomsbury" "is", "a" the retrieved item embedding for "Bloomsbury" is projected to have a length of 160 whereas the item embeddings for "is" and "a" do not need projecting since these already have a length of 160.

The electronic device feeds 408 the projected item embedding for "Bloomsbury" and the retrieved item embeddings for "is" and "a" into a neural network language model such as that described above with reference to FIG. 3. The neural network language model computes a predicted item embedding 410 which is used to compute scores 412 of a plurality of text items that have embeddings in the embedding table 420. The highest scoring text items are selected as candidate next items 414 in the sequence. One or more of the candidates are offered 416 to a user, for example, by being displayed on a virtual keyboard, and are input 418 to the electronic device when selected by a user.

Figure 5:
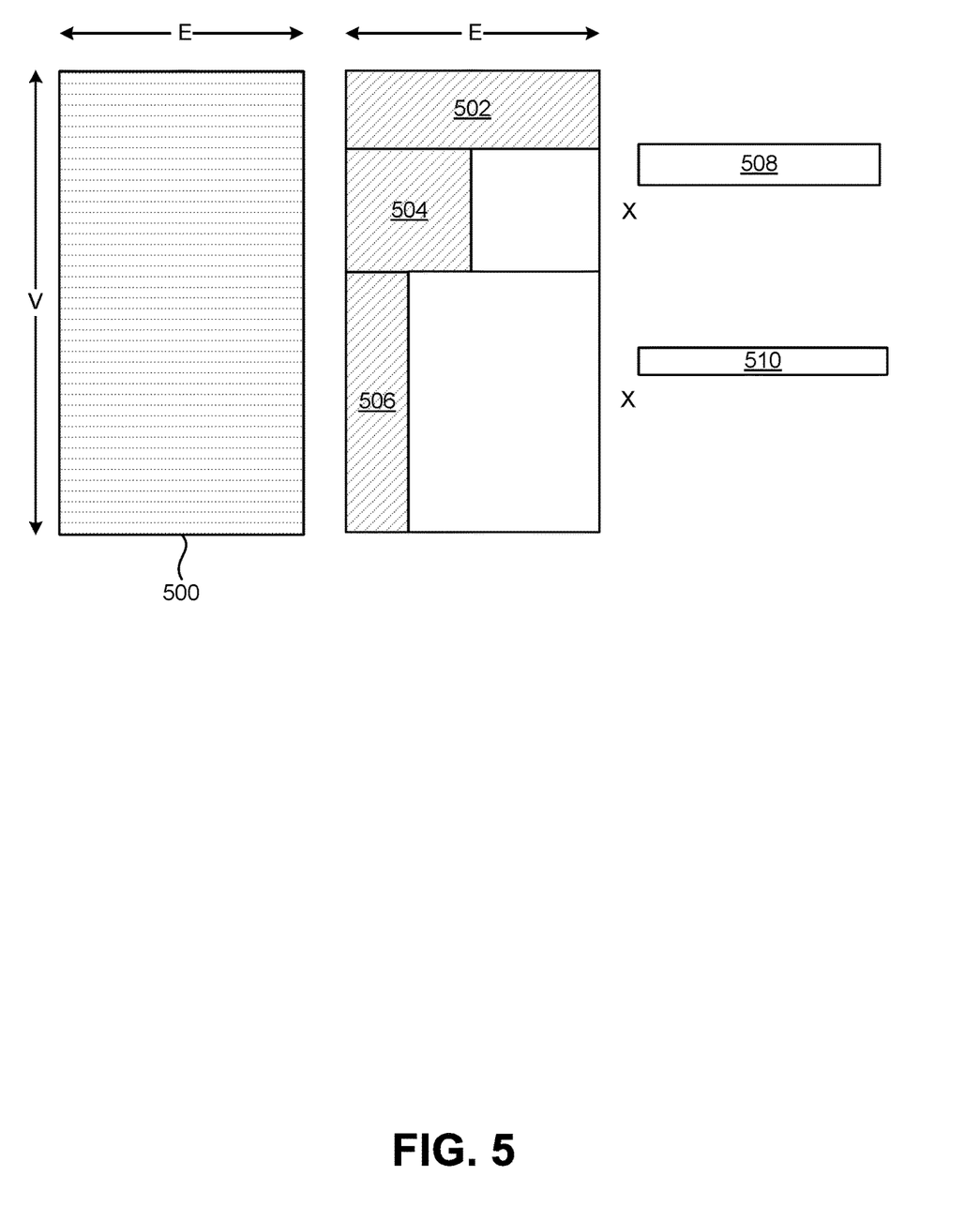
FIG. 5 is a schematic diagram of a text item embedding table with full length embeddings, a corresponding text item embedding table with variable length embeddings, and two adaptor matrices.

FIG. 5 is a schematic diagram of an embedding table 500 of V rows each having length E. In this case each item embedding has the same length. FIG. 5 illustrates how memory is saved by using a variable length embedding table 512. In the case of table 512 there is a first plurality of item embeddings 502 with full length item embeddings, a second plurality of item embeddings 504 with half length item embeddings and a third plurality of item embeddings 506 with quarter length item embeddings. In this example, the item embeddings with the same length are grouped together in the table so that full length item embeddings are in a known range of rows, half length item embeddings are in a known range of rows and quarter length item embeddings are in a known range of rows. Grouping the item embeddings by length in the table is helpful for retrieving item embeddings of a specified length but is not essential. When the item embeddings are grouped by length in the table, the table may be stored as a jagged array which facilitates matrix operations during scoring at an output phase of the neural network. A jagged array is an array of arrays where the arrays are of different sizes. The table may also be stored in multiple separate arrays, with one array for each distinct embedding size; this is referred to as the multiple multidimensional array approach in this document. Alternatively, the table may be stored in a single contiguous array, with the length and number-of-words of each embedding size also stored in order to efficiently index individual embeddings; this is referred to as the single array approach in this document.

In the jagged array approach, the whole table is stored as an array of pointers (which are memory addresses). Each pointer identifies an array for an individual item embedding, which stores the length of the embedding, and the numerical embedding elements. This storage scheme is flexible.

In the multiple multidimensional array approach, the embeddings are grouped by length. A separate embedding array is stored for each embedding length by allocating an array of size equal to the product of the number of embeddings and the embedding length. An indexing scheme of strided indices is used to locate embeddings from the multiple multidimensional array. This is especially effective in the case that adaptor matrices are used although it is less efficient where only one or two possible lengths of embedding are used.

In the single array approach, the variable sized embedding vectors are concatenated into one long array. In order to efficiently compute the similarity measure for every item in the array and to lookup an embedding, another array is stored containing the cumulative length of the embeddings before this index. Using this scheme it is efficient to scan through each embedding (which is useful for computing the similarity measure on the output), using the difference between two consecutive cumulative lengths to specify the length of the embedding. It is also efficient to look up an embedding given an index, using the cumulative length at that index as an offset into the array, and again using the difference between that and the next cumulative length to specify the length of the embedding.

FIG. 5 also shows two adaptor matrices 508, 510 which are learnt and which are used in some methods of projection of the item embeddings as described in more detail with reference to FIG. 6. In the example of FIG. 5 there is one adaptor matrix 508 for the half length item embeddings 504 and one adaptor matrix 506 for the quarter length item embeddings. Where there are more possible lengths of item embedding then more adaptor matrices are used, one for each possible length of item embedding except the maximum item embedding. In the case where adaptor matrices are used the variable length embedding table has about ten or fewer possible lengths of item embedding. This enables memory to be saved for many practical applications since the memory taken by the adaptor matrices is less than the memory saved by the use of short item embeddings in the table for low frequency items. However, it is also possible to have a variable length embedding table where the number of possible item embedding lengths is greater than ten and up to a maximum of the number of columns of the table. This is achieved by using zero padding rather than adaptor matrices as described in more detail below.

Each adaptor matrix 508, 510 comprises an array of numerical values which have been learnt. Multiplication of an item embedding and a corresponding adaptor matrix gives a projected item embedding of a specified length. The projected item embedding is the result of a linear transformation of the original item embedding. The numerical values of the adaptor matrix are learnt as part of the whole learning process for the neural network 110. As explained above with reference to FIG. 3, the neural network 300 is trained using back propagation or any other neural network training algorithm. A back propagation algorithm comprises inputting a labeled training data instance to the neural network, propagating the training instance through the neural network (referred to as forward propagation) and observing the output. Where one or more adaptor matrices are to be trained as well, the forward propagation includes propagating the training instance through the adaptor matrices. The training data instance is labeled and so the ground truth output of the neural network is known and the difference or error between the observed output and the ground truth output is found and provides information about a loss function. A search is made to try find a minimum of the loss function which is a set of weights of the neural network, and values of the entries in the adaptor matrices, that enable the output of the neural network to match the ground truth data.

Searching the loss function is achieved using gradient descent or stochastic gradient descent or in other ways.

A full length item embedding is an item embedding with a length that is a maximum number of columns of an item embedding table. A short item embedding is an item embedding with less than a maximum number of columns of the item embedding table.

Figure 6:
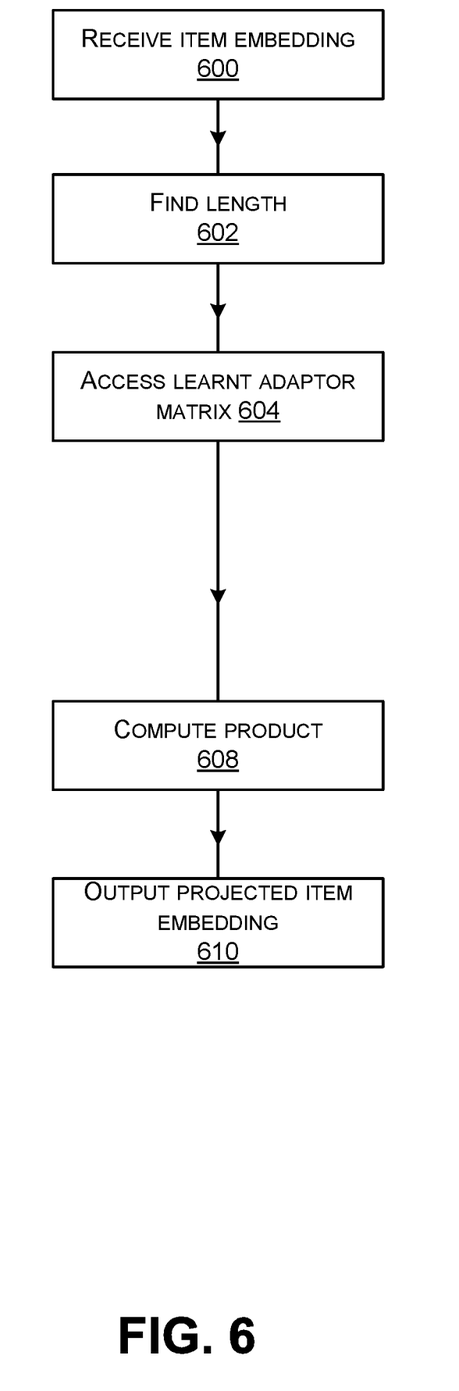
FIG. 6 is a schematic diagram of a process at a projection component.

FIG. 6 is a method of projecting up a short item embedding to a full length item embedding using an adaptor matrix. This method is carried out by a projector such as projector 112 of FIG. 1 or projector 926 of FIG. 9. The projector receives 600 an item embedding which is a short item embedding. The projector finds 602 a length of the item embedding such as by inspecting the number of elements in the item embedding. The projector accesses 604 a learnt adaptor matrix for the length of the item embedding. For example, the electronic device has a store with a plurality of adaptor matrices associated with different lengths and the projector selects the adaptor matrix for the particular length concerned. The short item embedding is multiplied 608 with the selected adaptor matrix and the result is a projected item embedding with the full length which is output 610.

Figure 7:
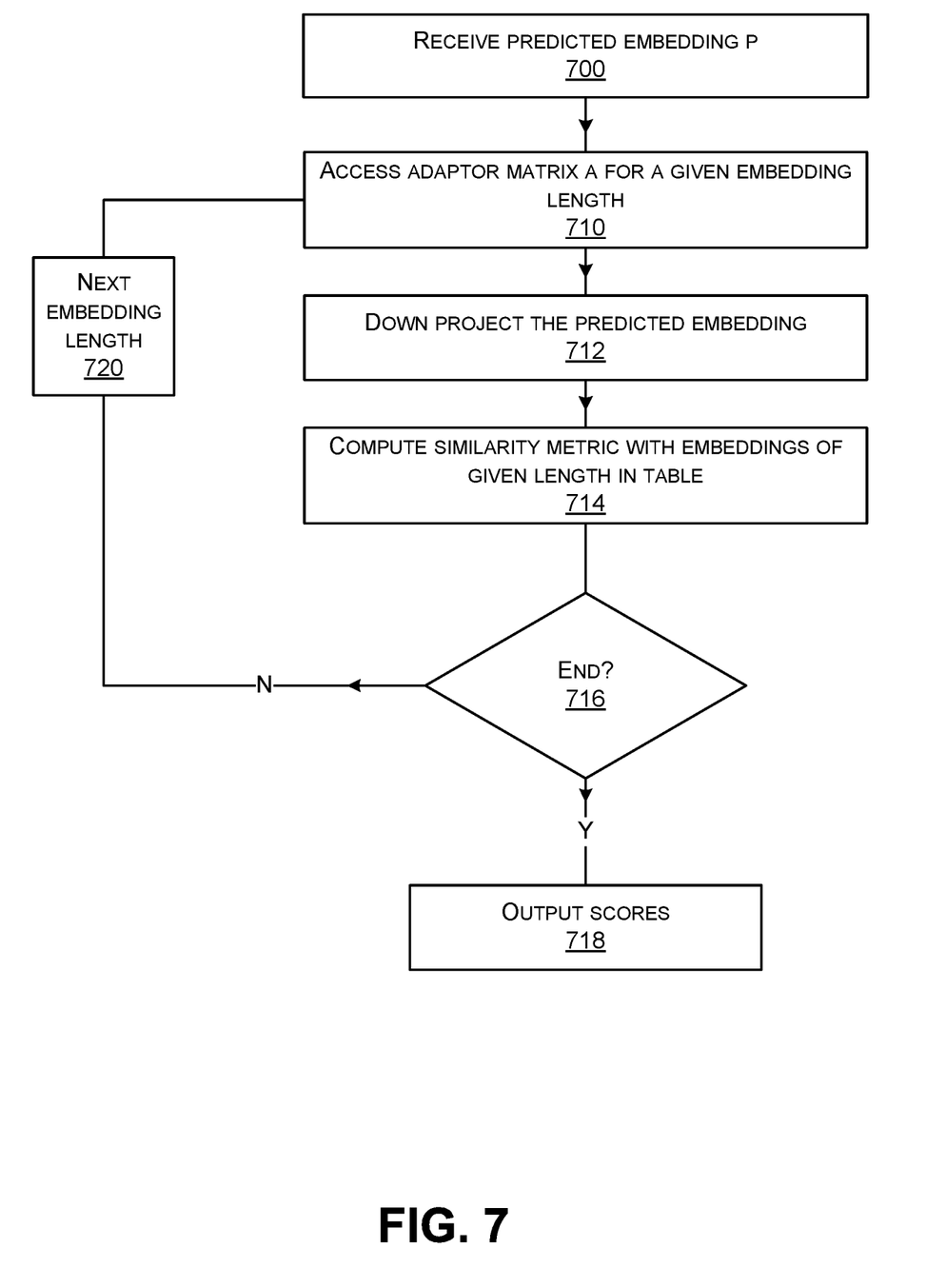
FIG. 7 is a schematic diagram of a process at a scoring component.
Figure 9:
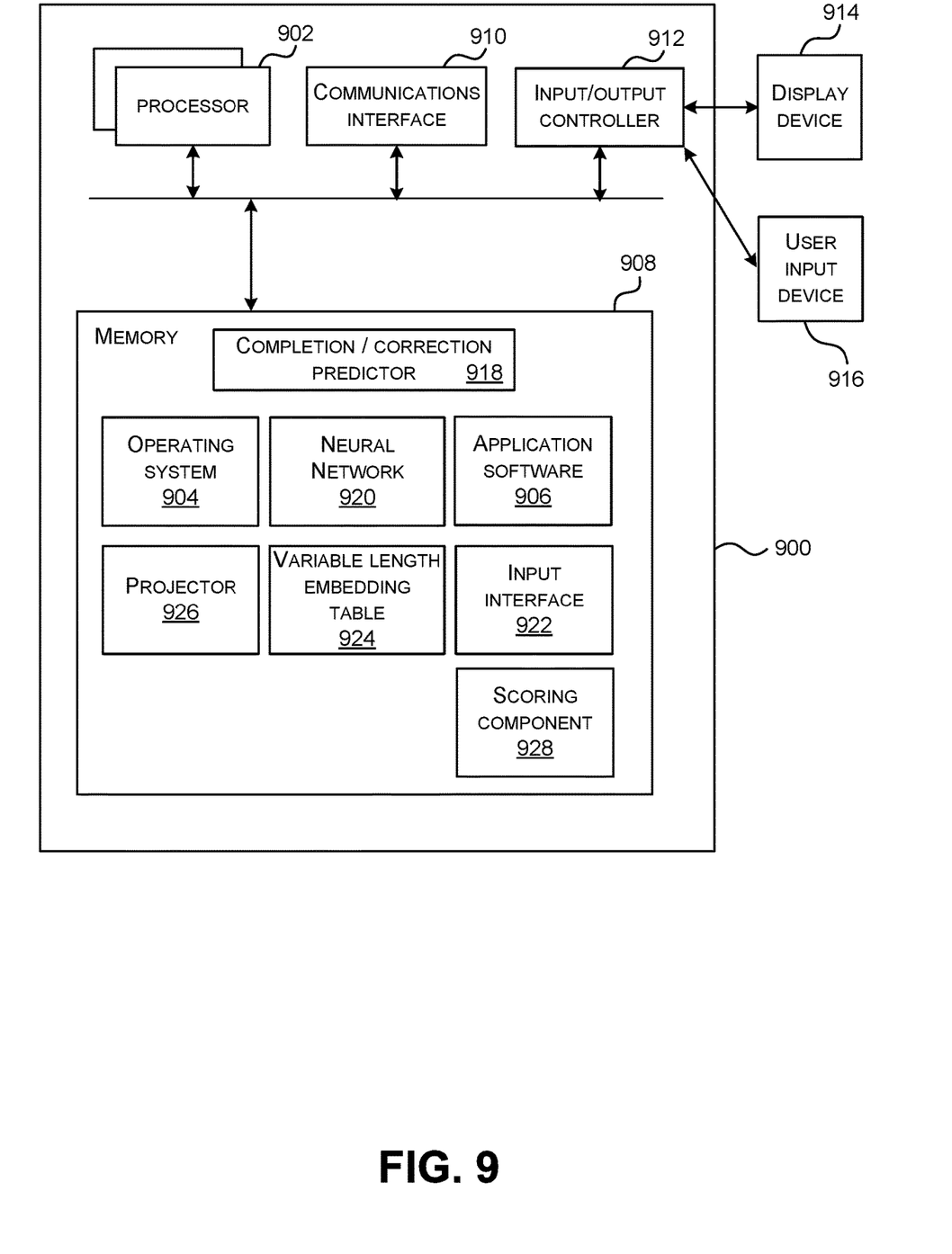
FIG. 9 illustrates an exemplary computing-based device in which embodiments of a neural network data entry system are implemented.

FIG. 7 is an example method at a scoring component such as scoring component 120 of FIG. 1 or scoring component 928 of FIG. 9. The scoring component receives 700 a predicted embedding from the neural network 110. It accesses 710 an adaptor matrix A for a given embedding length. For example, suppose it accesses adaptor matrix 508 for the half length item embeddings of FIG. 5. The scoring component, in conjunction with the projector 112, 926, down projects 712 the predicted embedding by multiplying a transpose of the adaptor matrix with the predicted embedding. This gives a shortened version of the predicted embedding, in this case, half the length of the original predicted embedding.

The scoring component computes 714 a similarity metric between the down projected predicted embedding and each of the half length embeddings in the variable length embedding table 420. For example, the similarity metric is a dot product. This gives scores, one score for each half length item embedding in the table 420. The scoring component checks 716 whether to end the scoring process. It ends the process if all the short embeddings in the table 420 have been considered. If not, it moves to a next embedding length 720 such as the quarter length embeddings 506 and repeats operations 710, 712, 714 and 716. When the process ends it outputs the computed scores 718 which are normalized using a softmax or other normalization process in some cases. In this way, scores are obtained for the item embeddings in the table 420 even though these item embeddings are of different lengths.

By down projecting the predicted embedding at operation 712 efficiencies are achieved since this operation is performed only once for each adaptor matrix and it is not necessary to perform this operation for each row of the embeddings table 420. Also, the dot product (or other similarity metric) is computed in a smaller subspace as compared with an alternative of up projecting the item embeddings from the table 420 and then computing the similarity metric.

Figure 8A:
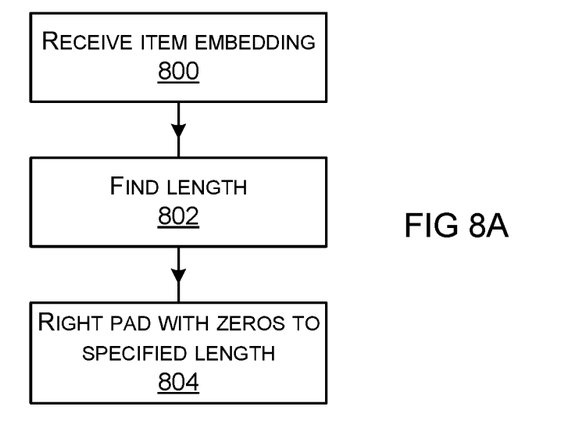
FIG. 8A is a schematic diagram of a process at another projection component.

In another example discussed with reference to FIG. 8A, the projector 112, 926 pads the short item embeddings with zeros to bring them to the full length. In this case, the projector receives 800 a short item embedding, inspects its length and right pads 804 the short item embedding with zeros to bring the length to a specified length such as the maximum number of columns of the variable length embedding table 420.

Figure 8B:
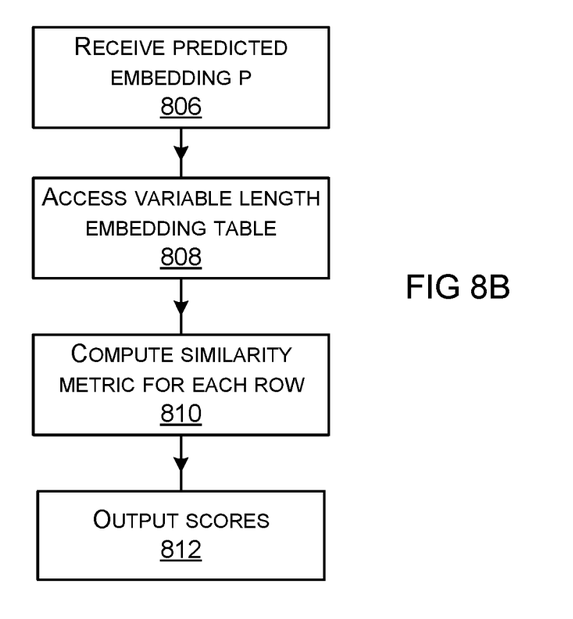
FIG. 8B is a schematic diagram of another process at a scoring component.

As described in FIG. 8B, the scoring component receives 806 a predicted embedding p, accesses 808 the variable length embedding table 420, and computes 810 a similarity metric such as a dot product between the predicted embedding and each of the rows of the table. Any short embeddings compute a truncated dot product with a left prefix of the predicted embedding, up to the item embedding length. This is mathematically equivalent to a full dot product after right padding with zeros, and is more computationally efficient. The resulting scores are output 812 (after being normalized using a softmax or similar normalization process in some cases) and used in the same manner as the scores described with reference to FIG. 4.

In another example, the projector may be constructed from two separate general neural networks for each embedding length. The first is trained using backpropagation to transform the smaller item embeddings to the full embedding size for input to the neural network language model 110. The second is trained using backpropagation to transform the predicted embedding output from neural network language model 110 to the smaller item embeddings for use in the scoring component 120.

FIG. 9 illustrates various components of an exemplary computing-based device 900 which are implemented as any form of electronic device in which embodiments of the methods of FIGS. 4 and 6 to 8 are implemented in some examples.

Computing-based device 900 comprises one or more processors 902 which are microprocessors, controllers or any other suitable type of processors for processing computer executable instructions to control the operation of the device in order to predict candidate items in a sequence of items to facilitate entry of the items into the electronic device 900. In some examples, for example where a system on a chip architecture is used, the processors 902 include one or more fixed function blocks (also referred to as accelerators) which implement a part of the method of FIGS. 4 and 6 to 8 in hardware (rather than software or firmware). Platform software comprising an operating system 904 or any other suitable platform software is provided at the computing-based device 900 to enable application software 906 to be executed on the device. A neural network language model 920 is stored at the electronic device. An input interface 722 receives items in a sequence of items to enable a user to input the item to the electronic device 900. A variable length embedding table 924 comprises a plurality of item embeddings of the neural network where there is a plurality of different lengths of item embedding. Completion/correction predictor 918 uses output from the neural network 920 to complete words, phrases, emoji or other items. For example, the completion/correction predictor 918 is a predictive keyboard or a predictive speech recognition system. Projector 926 computes up or down projections of item embeddings, either those predicted by neural network 920 or those stored in variable length embedding table 924. Scoring component 926 computes scores of predicted item embeddings from the neural network 920 with respect to item embeddings from the variable length embedding table 924.

The computer executable instructions are provided using any computer-readable media that is accessible by computing based device 900. Computer-readable media includes, for example, computer storage media such as memory 908 and communications media. Computer storage media, such as memory 908, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 908) is shown within the computing-based device 900 it will be appreciated that the storage is, in some examples, distributed or located remotely and accessed via a network or other communication link (e.g. using communication interface 910).

The computing-based device 900 also comprises an input/output controller 912 arranged to output display information to a display device 914 which may be separate from or integral to the computing-based device 900. The display information may provide a graphical user interface. The input/output controller 912 is also arranged to receive and process input from one or more devices, such as a user input device 916 (e.g. a mouse, keyboard, camera, microphone or other sensor). In some examples the user input device 916 detects voice input, user gestures or other user actions and provides a natural user interface (NUI). This user input may be used to input data to the electronic device. In an embodiment the display device 914 also acts as the user input device 916 if it is a touch sensitive display device. The input/output controller 912 outputs data to devices other than the display device in some examples, e.g. a locally connected printing device.

Any of the input/output controller 912, display device 914 and the user input device 916 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A data entry system comprising:

a user interface which receives a sequence of one or more context text items input by a user;

a predictor trained to predict a next item in the sequence;

the predictor comprising a plurality of learnt text item embeddings each text item embedding representing a text item in a numerical form, the text item embeddings having a plurality of different lengths;

a projection component which obtains text item embeddings of the context text items and projects these to be of the same length;

the predictor comprising a trained neural network which is fed the projected text item embeddings and which computes a numerical output associated with the predicted next item.

The data entry system described above further comprising a scoring component which receives the numerical output of the predictor and computes a plurality of scores of the numerical output with reference to each of a plurality of item embeddings of different lengths, the item embeddings being of text items from a vocabulary.

The data entry system described above wherein the scoring component is configured to compute a dot product of a prefix of the numerical output of the predictor with item embeddings having a length the same as the prefix.

The data entry system described above comprising at least one table of item embeddings, comprising the item embeddings of text items of the vocabulary used by the scoring component, and the text item embeddings of the context items.

The data entry system described above wherein the at least one table of item embeddings is stored in a plurality of separate arrays, one for each item embedding length.

The data entry system described above wherein item embeddings having a same length are stored as adjacent rows of the table of item embeddings.

The data entry system described above wherein the at least one table of item embeddings is stored as a single array in which item embeddings having a same length are stored as adjacent rows of the array and wherein information about which ranges of rows store which lengths of item embedding is also stored.

The data entry system described above wherein the projection component comprises at least two neural networks, one trained to project up item embeddings to a maximum length and one trained to project down item embeddings from the maximum length to a shorter length.

The data entry system described above wherein the projection component comprises two neural networks for each length of item embedding which is shorter than a maximum length of an item embedding.

The data entry system described above wherein the projection component projects the item embeddings of the context items to be the same length by adding zeros to increase the length of some of the item embeddings.

The data entry system described above wherein the projection component projects the item embeddings of the context items by multiplying with a learnt adaptor matrix.

The data entry system described above wherein the projection component comprises a plurality of learnt adaptor matrices, one for each possible item embedding length which is less than a specified maximum.

The data entry system described above wherein the projection component is configured to learn the adaptor matrix as part of training of the neural network.

The data entry system described above wherein the projection component is configured to down project the numerical output of the predictor by reducing its length using the learnt adaptor matrix.

The data entry system described above wherein the projection component is configured to down project the numerical output of the predictor by reducing its length to match that of one or more text item embeddings in a vocabulary used by a scoring component to compute scores of the numerical output.

The data entry system described above wherein the down projection comprises computing a multiplication of the numerical output of the predictor with the adaptor matrix, prior to computing a dot product of the result of the multiplication with an item embedding with a length associated with the adaptor matrix.

A computer-implemented method comprising:

receiving a sequence of one or more context text items input by a user;

storing at a memory a plurality of learnt text item embeddings each text item embedding representing a text item in a numerical form, the text item embeddings having a plurality of different lengths;

retrieving text item embeddings of the context text items from the memory and projecting the retrieved text item embeddings to be of the same length; and inputting the projected text item embeddings to a trained neural network language model and which computes a numerical output associated with a predicted next item of the sequence.

The method described above comprising computing a plurality of scores of the numerical output with reference to each of a plurality of item embeddings of different lengths, the item embeddings being of text items from a vocabulary.

The method described above comprising using a single table at the memory to store both the item embeddings of text items of the vocabulary used by the scoring component, and the text item embeddings of the context items.

One or more device-readable media with device-executable instructions that, when executed by a computing system, direct the computing system to perform for performing operations comprising receiving a sequence of one or more context text items input by a user;

storing at a memory a plurality of learnt text item embeddings each text item embedding representing a text item in a numerical form, the text item embeddings having a plurality of different lengths;

retrieving text item embeddings of the context text items from the memory and projecting the retrieved text item embeddings to be of the same length; and inputting the projected text item embeddings to a trained neural network language model and which computes a numerical output associated with a predicted next item of the sequence.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A data entry system comprising:
a user interface which receives a sequence of one or more context text items input by a user;
processing circuitry configured to execute instructions to implement a plurality of software components, the software components comprising:
a predictor component trained to predict a next item in the sequence;
the predictor component comprising a plurality of text item embeddings stored in a vocabulary, each text item embedding representing a text item in a numerical form, and each text item embedding indicating weights for analysis of a representation of the text item in a trained neural network language model, with the text item embeddings having a plurality of different lengths;
a projection component which obtains text item embeddings for the context text items input by the user, the obtained text item embeddings being of the plurality of different lengths, and projects these to be of the same length;
the predictor component comprising a trained neural network which is fed the projected text item embeddings, having the same length, for use in the trained neural network language model, which computes a numerical output associated with the predicted next item.

2. The data entry system of claim 1 further comprising a scoring component which receives the numerical output of the predictor component and computes a plurality of scores of the numerical output with reference to each of a plurality of item embeddings of different lengths, the item embeddings being of text items from a vocabulary.

3. The data entry system of claim 2 wherein the scoring component is configured to compute a dot product of a prefix of the numerical output of the predictor component with item embeddings having a length the same as the prefix.

4. The data entry system of claim 2 comprising at least one table of item embeddings, comprising the item embeddings of text items of the vocabulary used by the scoring component, and the text item embeddings of the context items.

5. The data entry system of claim 4 wherein the at least one table of item embeddings is stored in a plurality of separate arrays, one for each item embedding length.

6. The data entry system of claim 4 wherein item embeddings having a same length are stored as adjacent rows of the table of item embeddings.

7. The data entry system of claim 4 wherein the at least one table of item embeddings is stored as a single array in which item embeddings having a same length are stored as adjacent rows of the array and wherein information about which ranges of rows store which lengths of item embedding is also stored.

8. The data entry system of claim 1 wherein the projection component comprises at least two neural networks, one trained to project up item embeddings to a predetermined length and one trained to project down item embeddings from the predetermined length to a length shorter than the predetermined length.

9. The data entry system of claim 8 wherein the projection component comprises two neural networks for each length of item embedding which is shorter than the predetermined length of an item embedding.

10. The data entry system of claim 1 wherein the projection component projects the item embeddings of the context items to be the same length by adding zeros to increase the length of some of the item embeddings.

11. The data entry system of claim 1 wherein the projection component projects the item embeddings of the context items by multiplying with an adaptor matrix.

12. The data entry system of claim 11 wherein the projection component comprises a plurality of adaptor matrices, one for each of a plurality of predetermined embedding lengths which are less than a specified maximum.

13. The data entry system of claim 11 wherein the projection component is configured to learn the adaptor matrix as part of training of the neural network.

14. The data entry system of claim 11 wherein the projection component is configured to down project the numerical output of the predictor component by reducing its length using the adaptor matrix.

15. The data entry system of claim 1 wherein the projection component is configured to down project the numerical output of the predictor component by reducing its length to match that of one or more text item embeddings in a vocabulary used by a scoring component to compute scores of the numerical output.

16. The data entry system of claim 15 wherein the down projection comprises computing a multiplication of the numerical output of the predictor component with the adaptor matrix, prior to computing a dot product of the result of the multiplication with an item embedding with a length associated with the adaptor matrix.

17. A computer-implemented method comprising:
receiving a sequence of one or more context text items input by a user;
accessing, from a memory, a plurality of text item embeddings stored in a vocabulary, each text item embedding representing a text item in a numerical form, and each text item embedding indicating weights for analysis of a representation of the text item in a trained neural network language model, with the text item embeddings having a plurality of different lengths;
retrieving, from the memory, text item embeddings for the context text items input by the user, the retrieved text item embeddings being of the plurality of different lengths, and projecting the retrieved text item embeddings to be of the same length; and
inputting the projected text item embeddings, having the same length, for use in the trained neural network language model, which computes a numerical output associated with a predicted next item of the sequence.

18. The method of claim 17 comprising computing a plurality of scores of the numerical output with reference to each of a plurality of item embeddings of different lengths, the item embeddings being of text items from a vocabulary.

19. The method of claim 18 comprising using a single table at the memory to store both the item embeddings of text items of the vocabulary used by the computing of the plurality of scores, and the text item embeddings of the context items.

20. One or more device-readable media with device-executable instructions that, when executed by a computing system, direct the computing system to perform operations comprising:
- receiving a sequence of one or more context text items input by a user;
- accessing, from a memory a plurality of text item embeddings each text item embedding stored in a vocabulary, representing a text item in a numerical form, and each text item embedding indicating weights for analysis of a representation of the text item in a trained neural network language model, with the text item embeddings having a plurality of different lengths;
- retrieving, from the memory, text item embeddings for the context text items input by the user, the retrieved text item embeddings being of the plurality of different lengths, and projecting the retrieved text item embeddings to be of the same length; and
- inputting the projected text item embeddings, having the same length, for use in the trained neural network language model, which computes a numerical output associated with a predicted next item of the sequence.

* * * * *